United States Patent
Abatzoglou et al.

(10) Patent No.: US 9,103,918 B2
(45) Date of Patent: Aug. 11, 2015

(54) ENHANCED RADAR RANGE RESOLUTION

(71) Applicant: RAYTHEON COMPANY, Waltham, MA (US)

(72) Inventors: Theagenis J. Abatzoglou, Huntington Beach, CA (US); Johan E. Gonzalez, Carson, CA (US); Joel K. McWilliams, Highland Village, TX (US); Raymond Samaniego, Prosper, TX (US); Mark B. Yeary, Krum, TX (US); Enrique A. Santiago, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 260 days.

(21) Appl. No.: 13/688,543

(22) Filed: Nov. 29, 2012

(65) Prior Publication Data

US 2014/0218231 A1 Aug. 7, 2014

(51) Int. Cl.
*G01S 13/90* (2006.01)
*G01S 7/28* (2006.01)

(52) U.S. Cl.
CPC .. *G01S 13/90* (2013.01); *G01S 7/28* (2013.01)

(58) Field of Classification Search
CPC .................................. G01S 13/90; G01S 7/28
USPC ....................................... 342/25 R–25 F, 179
See application file for complete search history.

(56) References Cited

U.S. PATENT DOCUMENTS

| | | | |
|---|---|---|---|
| 5,012,249 A * | 4/1991 | Chan | 342/25 A |
| 5,394,151 A | 2/1995 | Knaell et al. | |
| 5,708,436 A * | 1/1998 | Loiz et al. | 342/25 A |
| 6,018,306 A | 1/2000 | Serbin | |
| 6,255,981 B1 * | 7/2001 | Samaniego | 342/25 R |
| 6,388,605 B1 | 5/2002 | Petz et al. | |
| 6,943,724 B1 | 9/2005 | Brace et al. | |
| 7,038,612 B2 * | 5/2006 | Chow et al. | 342/25 F |
| 7,969,345 B2 | 6/2011 | Abatzoglou et al. | |
| 8,044,846 B1 * | 10/2011 | Urkowitz et al. | 342/179 |
| 8,816,896 B2 * | 8/2014 | Abatzoglou et al. | 342/105 |

(Continued)

OTHER PUBLICATIONS

Walker, J.L., "Range-Doppler Imaging of Rotating Objects", IEEE Transactions on Aerospace and Electronic Systems, vol. AES-16, No. 1, Jan. 1980, pp. 23-52.

(Continued)

*Primary Examiner* — Matthew M Barker
(74) *Attorney, Agent, or Firm* — Burns & Levinson LLP; Joseph M. Maraia (57) ABSTRACT

A synthetic aperture radar imaging method that combines each radar return pulse with a sinusoid to reduce the radar return pulses to a baseband frequency and deskew each radar return pulse. It includes determining a maximum likelihood estimate (MLE) of residual motion parameters for a dominant scatterer on the ground relative to the airborne radar and correcting for errors in inertial navigation system measurements based on the MLE residual motion parameters. It includes convolving each radar return pulse with its corresponding radar transmission pulse to generate a range compressed image for each radar return pulse and generating a sub-band range profile image for each radar return pulse and its corresponding radar transmission pulse based on the corresponding range compressed image that has been corrected for residual motion. Performing bandwidth extrapolation on each sub-band and subsequently combining the three bands to produce an enhanced resolution image without grating lobes.

14 Claims, 4 Drawing Sheets

(56) References Cited

U.S. PATENT DOCUMENTS

2010/0259442 A1  10/2010  Abatzoglou et al.
2014/0009326 A1* 1/2014  Wishart .................... 342/25 D

OTHER PUBLICATIONS

Sullivan, R., "Radar Foundations for Imaging and Advanced Concepts", Scitech Publishing, Inc., 2004, p. 174-176.

* cited by examiner

ENHANCED RADAR RANGE RESOLUTION

BACKGROUND

Current radar systems using step-frequency waveforms combine the RF bands to improve range resolution. However, the performance of these systems is limited by grating lobe effects at the boundaries of the radar image profiles.

SUMMARY

The technology described herein relates to synthetic aperture radar imaging methods and systems that reduce the effects of grating lobes.

One embodiment is a synthetic aperture radar imaging method that includes receiving a plurality of radar return pulses acquired by an airborne radar, wherein each radar return pulse is generated in response to a corresponding radar transmission pulse reflected from objects within a region of interest on the ground. The method also includes combining each radar return pulse with a sinusoid to reduce the radar return pulses to a baseband frequency and deskewing each radar return pulse to remove effects of its corresponding radar transmission pulse. The method also includes determining a maximum likelihood estimate (MLE) of residual motion parameters for a dominant scatterer on the ground relative to the airborne radar, based on the deskewed radar return pulses. The method also includes correcting for errors in inertial navigation system measurements based on the MLE residual motion parameters. The method also includes convolving each radar return pulse with its corresponding radar transmission pulse to generate a range compressed image for each radar return pulse. The method also includes generating an original sub-band range profile image for each radar return pulse and its corresponding radar transmission pulse based on the corresponding range compressed image that has been corrected for residual motion. The method also includes combining the sub-band range profile images to obtain a combined range profile image.

In some embodiments, the combined range profile image has a higher resolution than each of the original sub-band range profile images. In some embodiments, each sub-band range profile image is generated by extrapolating the sub-band to a common frequency band larger than each of the sub-band range profile images and forming a composite image using and image formation method. In some embodiments, the image formation method is selected from the group consisting of back projection or polar formatting.

In some embodiments, the radar transmission pulses are disjoint radio frequency bands. In some embodiments, two or more of the radar transmission pulses are partially overlapping radio frequency bands. In some embodiments, the partially overlapping radio frequency bands reduce side lobe effects in the combined range profile image. In some embodiments, convolving each radar return pulse with its corresponding radar transmission pulse to generate a range compressed image for each radar return pulse includes implementing a matched filter to generate the range compressed image for each radar return pulse.

Another embodiment is a synthetic aperture radar imaging system that includes a processor and a memory. The memory includes code representing instructions that when executed cause the processor to receive a plurality of radar return pulses from an airborne radar, wherein each radar return pulse is generated in response to a corresponding radar transmission pulse reflected from objects within a region of interest on the ground. The memory also includes code representing instructions that when executed cause the processor to combine each radar return pulse with a sinusoid to reduce the radar return pulses to a baseband frequency. The memory also includes code representing instructions that when executed cause the processor to deskew each radar return pulse to remove effects of its corresponding radar transmission pulse. The memory also includes code representing instructions that when executed cause the processor to determine a maximum likelihood estimate (MLE) of residual motion parameters for a dominant scatterer on the ground relative to the airborne radar, based on the deskewed radar return pulses. The memory also includes code representing instructions that when executed cause the processor to correct for errors in inertial navigation system measurements based on the MLE residual motion parameters. The memory also includes code representing instructions that when executed cause the processor to convolve each radar return pulse with its corresponding radar transmission pulse to generate a range compressed image for each radar return pulse. The memory also includes code representing instructions that when executed cause the processor to generate an original sub-band range profile image for each radar return pulse and its corresponding radar transmission pulse based on the corresponding range compressed image that has been corrected for residual motion. The memory also includes code representing instructions that when executed cause the processor to combine the sub-band range profile images to obtain a combined range profile image.

In some embodiments, the memory includes code representing instructions that when executed cause the processor to generate each sub-band range profile image by extrapolating the sub-band to a common frequency band larger than each of the sub-band range profile images and forming a composite image using an image formation method. In some embodiments, the image formation method is selected from the group consisting of back projection or polar formatting.

In some embodiments, the memory includes code representing instructions that when executed cause the processor to convolve each radar return pulse with its corresponding radar transmission pulse to generate a range compressed image for each radar return pulse by implementing a matched filter to generate the range compressed image for each radar return pulse. In some embodiments, the system includes a transmitter to transmit the radar transmission pulses towards the objects within a region of interest on the ground and a receiver to receive the radar return pulses.

The radar imaging methods and systems described herein (hereinafter "technology") can provide one or more of the following advantages. One advantage of the technology is that it provides a higher range resolution profile than each of the original sub-band range profile images because it extrapolates each sub-band to a common size band, produces a weighted range profile for each sub-band and then combines the sub-bands. Another advantage of the technology is that it reduces grating lobes in the profile image by forming the images before combining or aligning the sub-bands. Other aspects and advantages of the current invention will become apparent from the following detailed description, taken in conjunction with the accompanying drawings, illustrating the principles of the invention by way of example only. Another advantage of the technology is that it provides improved range resolution of airborne radar because grating lobe effects are reduced; thereby allowing the radar to distinguish between more closely spaced objects than would otherwise be possible.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
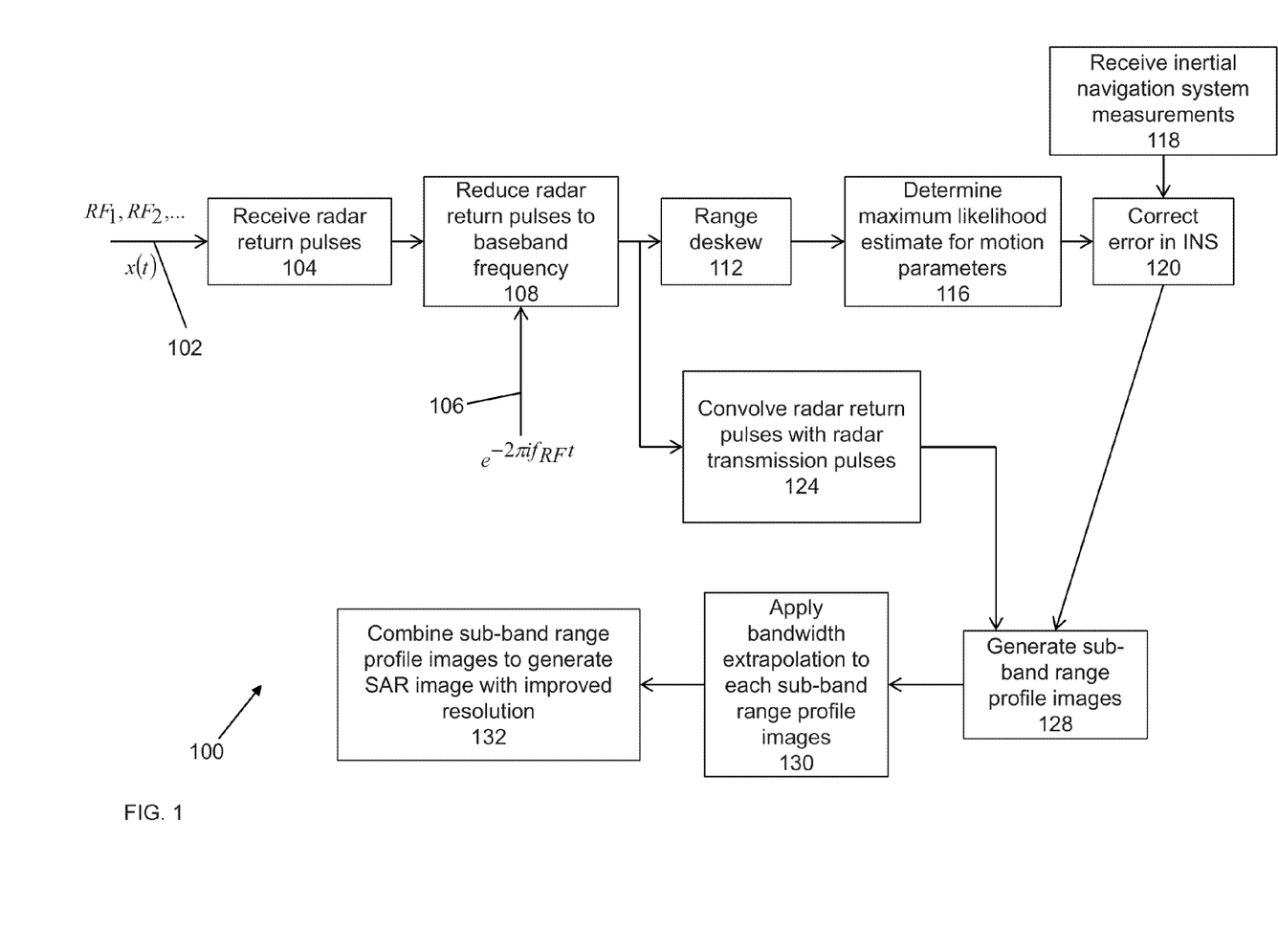
FIG. 1 is a flowchart of a method for a synthetic aperture radar imaging method, according to an illustrative embodiment.

FIG. 1 is a flowchart 100 of a method for a synthetic aperture radar imaging method, according to an illustrative embodiment. In some implementations, the method is used to improve an airborne radar system's ability to distinguish between two or more objects within a region of interest on the ground. The objects/scatterers scatter the radar transmissions that are directed towards the objects. The method improves the range resolution of the airborne radar, thereby allowing the radar to distinguish between more closely spaced objects than would otherwise be possible. In contrast to conventional methods, embodiments of the methods described herein form images for multiple RF bands and then match the images at respective boundaries of the RF bands of the images, rather than by overlapping the boundaries of the RF bands of the images.

Figure 2:
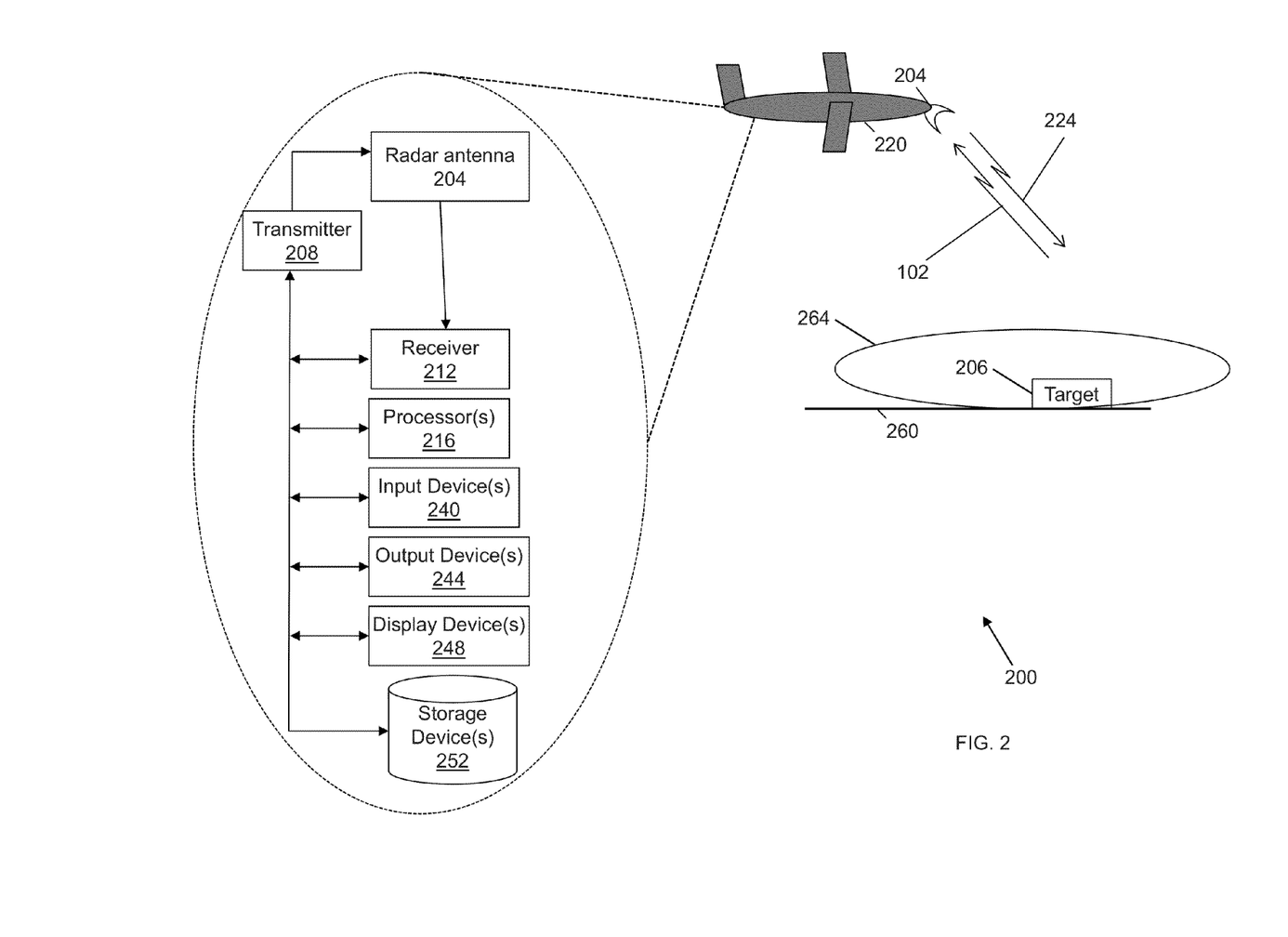
FIG. 2 is a block diagram of a synthetic aperture radar imaging system, according to an illustrative embodiment.

Referring to FIG. 2, in some embodiments, an aircraft (e.g., airplane 220 of FIG. 2) has a radar antenna 204 and includes a transmitter 208 and receiver 212. The transmitter 208 commands the antenna 204 to transmit radar transmission pulses 224 towards one or more objects 206 (e.g., targets) within a region of interest on the ground. The radar transmission pulses can be disjoint radio frequency bands where the bands do not overlap, or, the radar transmission pulses can partially overlap each other. Radar return pulses 102 are generated in response to the radar transmission pulses reflecting off of objects within the region of interest on the ground 260.

Referring to FIG. 1, the method includes receiving the pulses (step 104). Each radar return pulse is generated in response to a corresponding radar transmission pulse that is reflected from objects within the region of interest on the ground (e.g., region of interest 264 of FIG. 2). The method also includes reducing the radar return pulses to a baseband frequency (step 108) by combining each radar return pulse with a sinusoid 106 ($e^{-2\pi i f_{RF} t}$).

The output of step 108 is then provided to both of steps 112 and 124. Each reduced radar return pulse is then deskewed 112 to remove the effects of its corresponding radar transmission pulse. The method then includes determining a maximum likelihood estimate (MLE) of the residual motion parameters (relative to the airborne radar antenna) for a dominant scatterer among the objects on the ground. The MLE estimate (step 116) determines the range signal, velocity signal, and acceleration signal for the dominant scatterer in the field of view of the radar transmitter. The maximum likelihood estimate is determined based on the deskewed radar return pulses. The radar returns from a scatterer after matched filter and range deskew at baseband can be expressed as:

$$Y_{k,m} = z e^{-j4\pi/c(f_{RF}+k\Delta f)(r_0+v_0 mIPP+1/2\alpha_0 m^2 IPP^2)} \qquad \text{EQN. 1}$$

where z is the complex envelope of the scatterer, c is the speed of light, $f_{RF}$ is the center frequency of the radar, $\Delta f$ is the frequency step in fast time, $r_0$, $v_0$, $\alpha_0$ are the range, radial velocity and acceleration of the scatterer. IPP is the interpulse period. The maximum likelihood estimate for $r_0$, $v_0$, $\alpha_0$ is obtained by:

$$\underset{r,v,\alpha}{\text{Max}} \left\{ \left| \sum_{k,m} Y_{k,m} e^{j4\pi/c(f_{RF}+k\Delta f)(r+vmIPP+1/2\alpha m^2 IPP^2)} \right| \right\}. \qquad \text{EQN. 2}$$

The method also includes receiving inertial navigation system measurements for the aircraft (step 118) and then correcting (step 120) for errors in the inertial navigation system measurements based on the MLE residual motion parameters. The square components of the INS acceleration errors are determined with the following set of equations:

$$\begin{bmatrix} (\tilde{\vec{p}}_r(0) - \vec{p}_{MLE,1})^T \\ (\tilde{\vec{p}}_r(0) - \vec{p}_{MLE,2})^T \\ (\tilde{\vec{p}}_r(0) - \vec{p}_{MLE,3})^T \end{bmatrix} \vec{\alpha} = \begin{bmatrix} \Omega_{MLE,1} \\ \Omega_{MLE,2} \\ \Omega_{MLE,3} \end{bmatrix}; \qquad \text{EQN 3}$$

$$\vec{\alpha} = \begin{bmatrix} (\tilde{\vec{p}}_r(0) - \vec{p}_{MLE,1})^T \\ (\tilde{\vec{p}}_r(0) - \vec{p}_{MLE,2})^T \\ (\tilde{\vec{p}}_r(0) - \vec{p}_{MLE,3})^T \end{bmatrix}^{-1} \begin{bmatrix} \Omega_{MLE,1} \\ \Omega_{MLE,2} \\ \Omega_{MLE,3} \end{bmatrix}; \qquad \text{EQN. 4}$$

$$\vec{\alpha} = \begin{bmatrix} \alpha_x \\ \alpha_y \\ \alpha_z \end{bmatrix} \qquad \text{EQN. 5}$$

where $\vec{\alpha}$ is the acceleration estimate along three dimensions $\vec{p}_{MLE,1}$, $\vec{p}_{MLE,2}$, $\vec{p}_{MLE,3}$ are the estimated positions of the focusing points on the group, and $\Omega_{MLE,1}$, $\Omega_{MLE,2}$, $\Omega_{MLE,3}$ are the radial acceleration estimates relative to the first, second and third focusing points, $\tilde{\vec{p}}_r(0)$ is the position of the platform at the center of the center of the radar collection dwell.

The method also includes a match filtering step (step 124) in which each radar return pulse is convolved with its corresponding transmission pulse to generate a range compressed image for each radar return pulse. Each radar compressed image and the residual motion parameters are provided to step 128, after which the method then includes generating an original sub-range profile image (step 128) for each radar return pulse and its corresponding radar transmission pulse based on the corresponding range compressed image that has been corrected for residual motion. In some embodiments, step 128 includes generating the original sub-range profile image via backprojection. Backprojection aligns the phase of radar return pulse and its corresponding radar transmission pulse for each range location in accordance with:

$$BP(x, y) \approx \xi \sum_m e^{4\pi j/\lambda \left(-\vec{n}_{x_0,y_0} \cdot \Delta p - \vec{\beta} \cdot \Delta pm IPP + \gamma m^2 IPP^2\right)} \qquad \text{EQN. 6}$$

$$\frac{\sin[2\pi T\alpha/c\vec{n}_{x_0,y_0} \cdot \Delta p]}{2\pi\alpha/c\vec{n}_{x_0,y_0} \cdot \Delta p}$$

where $\vec{n}_{x_0,y_0} = \dfrac{\vec{p}_r(0) - \vec{p}_{x_0,y_0}}{\|\vec{p}_r(0) - \vec{p}_{x_0,y_0}\|}$ is a unit vector from the radar to the point on the group, $\vec{p}_r(0)$ is the radar location vector and $\vec{p}_{x_0,y_0}$ is the position of the scatter on the group. $\Delta p = \vec{p}_{x,y} - \vec{p}_{x_0,y_0}$ is the difference between an initial test location (e.g., estimate of the location) and the true location of the ground scatterer. In addition, $$\vec{\beta} = \frac{\vec{v} - (\vec{n}_{x_0,y_0} \cdot \vec{v})\vec{n}_{x_0,y_0}}{R_{x_0,y_0}(0)} \qquad \text{EQN. 7}$$

is the radar velocity component normal to the radial direction, and $$\gamma = \frac{1}{2} \frac{\vec{n}_{x_0,y_0} \cdot \vec{v}}{R_{x_0,y_0}(0)^2} [3(\vec{n}_{x_0,y_0} \cdot \vec{v})\vec{n}_{x_0,y_0} - 2\vec{v}] \cdot \Delta p \qquad \text{EQN. 8}$$

is the normalized acceleration, and wherein α is the chirp rate of a linearly frequency modulated waveform, T is the waveform duration, and IPP is the interpulse period (or inverse of the pulse repetition frequency). The method then includes applying bandwidth extrapolation (step 130) to each sub-band range profile image. One method of performing bandwidth extrapolation involves applying the BURG algorithm to the samples of the data. The BURG extrapolation algorithm is applied to expand each frequency sub-band to a common size band. By applying the BURG algorithm to the samples of the data, we obtain a set of linear prediction coefficients $\{\beta_k\}$. The samples are predicted in the forward direction with the following equation:

$$y_k = \sum_{p=1}^{P} \beta_{P+1-p} y_{k-p}, \qquad \text{EQN. 9}$$

where k is the fast-frequency index, and k varies from P+1 to N. Similarly, the backward prediction equations are given by:

$$\bar{y}_k = \sum_{p=1}^{P} \beta_{P+1-p} \bar{y}_{k+p}, \qquad \text{EQN. 10}$$

where k varies from 1 to K−P.

In some embodiments, step 128 instead includes generating the original sub-range profile image via a polar formatting step prior to applying bandwidth extrapolation. Polar formatting is an algorithm used to form SAR images from phase histories, as described, for example, in, Walker, J. L, "Range-Doppler Imaging of Rotating Objects", IEEE Transactions on Aerospace and Electronic Systems, Vol. AES-16, No. 1, January 1980, pp. 23-52, the entire contents of which is hereby incorporated by reference in its entirety.

The original sub-band range profile images are then combined to obtain a combined range profile image (step 132). The combined range profile image has a higher resolution than each of the original sub-band range profile images. In one embodiment, three radar return pulses are generated for three sub-bands ($BW_1$, $BW_2$, $BW_3$) and the combined range profile image is determined in accordance with:

$$RP(r) = RP_1(r)e^{j\phi_1}e^{4\pi j \frac{r}{c} f_{RF_1}} + \qquad \text{EQN. 11}$$
$$RP_2(r)e^{j\phi_2}e^{4\pi j \frac{r}{c} f_{RF_2}} + RP_3(r)e^{j\phi_3}e^{4\pi j \frac{r}{c} f_{RF_3}}$$

$$RP_k(r) = e^{-j\phi_k} RP_c(r - r_0) e^{-4\pi j \frac{r_0}{c} f_{RF_1}} \qquad \text{EQN. 12}$$

$$RP(r) = e^{4\pi j \frac{(r-r_0)}{c} f_{RF_2}} RP_c(r - r_0) \frac{\sin(6\pi)BW\left(\frac{r-r_0}{c}\right)}{\sin(2\pi)BW\left(\frac{r-r_0}{c}\right)} \qquad \text{EQN. 13}$$

where $BW = f_{RF_2} - f_{RF_1}$ where r is the range, c is the speed of light, $f_{RF_i}$ is the center RF frequency of the $i^{th}$ RF band in question, $e^{j\Phi_1}, e^{j\Phi_2}, e^{j\Phi_3}$ are calibration phasors, $RP_c$ is the range profile obtained by using amplitude weights in its formation, and $$e^{4\pi j \frac{r}{c} RF_i}$$

is the range dependent phasor. The combined range profile is a SAR image that has improved resolution and in which the grating lobes have been reduced or eliminated.

Next, the determination of the calibration phasors is described. Each range profile vector, one per RF frequency, is obtained by sampling the range profile function at the range of the dominant scatterers.

$$\vec{RP_1} = \begin{bmatrix} RP_1(r_1) \\ \vdots \\ RP_1(r_q) \end{bmatrix} = D_1 \begin{bmatrix} z_1 \\ \vdots \\ z_q \end{bmatrix} e^{-j\phi_1} \qquad \text{EQNS. 14 and 15}$$

$$D_1 = \begin{bmatrix} e^{-4\pi j \frac{r_1}{c} f_{RF_1}} & 0 & 0 \\ 0 & \ddots & 0 \\ 0 & 0 & e^{-4\pi j \frac{r_q}{c} f_{RF_1}} \end{bmatrix},$$

and similarly for the other RFs. The calibration phasors can be obtained by determining the differences in the correction phases between each pair of range profile vectors, $\Delta\phi_1 = \phi_2 - \phi_1$ and $\Delta\phi_2 = \phi_3 - \phi_1$. The calibration phasor is applied to each range profile vector (the sub-band range profile image) to match the phase at the boundaries of the range profile vectors (the sub-band range profile images) prior to combining them to generate the combined range profile image. This can be achieved by solving the following system of equations, $$\alpha z - \overline{\alpha z} - \beta w\bar{z} + \overline{\beta w}z = 0 \qquad \text{EQN. 16}$$

$$\gamma w - \overline{\gamma w} + \beta w\bar{z} - \overline{\beta w}z = 0 \qquad \text{EQN. 17}$$

where $z = e^{j\Delta\Phi_1}$, $w = e^{j\Delta\Phi_2}$, the complex coefficients are $\alpha = \vec{s}_1 * \vec{s}_2$, $\beta = \vec{s}_2 * \vec{s}_3$, $\gamma = \vec{s}_1 * \vec{s}_3$, and $\vec{s}_1$, $\vec{s}_2$, and $\vec{s}_3$ represent three range profile vectors. $\vec{s}_1$ consists of the product of the $e^{-j\Phi_1}$ and the vector of complex envelopes of the dominant scatterers of the target, $\vec{s}_2$ consists of the product of the $e^{-j\Phi_2}$ and the vector of complex envelopes of the dominant scatterers of the target, and $\vec{s}_3$ consists of the product of the $e^{-j\Phi_3}$ and the vector of complex envelopes of the dominant scatterers of the target:

$$\vec{s}_1 = D_1^{-1} R \vec{P}_1 \qquad \text{EQN. 18}$$

$$\vec{s}_2 = D_2^{-1} R \vec{P}_2 \qquad \text{EQN. 19}$$

$$\vec{s}_3 = D_3^{-1} R \vec{P}_3 \qquad \text{EQN. 20}$$

Solving equations 16 and 17 above involves standard algebraic manipulations that lead to finding the roots of a fourth order polynomial, of which only the solutions near the unit circle are physical.

FIG. 2 is a schematic illustration of components or modules for the synthetic aperture radar imaging system 200, according to an illustrative embodiment. The system 200 includes airplane 220, radar antenna 204, transmitter 208 and receiver 212. The transmitter 208 commands the antenna 204 to transmit radar transmission pulses 224 towards one or more objects 206 (e.g., targets) within a region of interest on the ground. Radar return pulses 102 are generated in response to the radar transmission pulses reflecting off of objects within the region of interest on the ground 260.

The system 200 also includes one or more input devices 240, one or more output devices 244, one or more display devices 248, one or more processors 216, and one or more storage devices 252. The modules and devices described herein can, for example, utilize the one or more processors 216 to execute computer executable instructions and/or the modules and devices described herein can, for example, include their own processor to execute computer executable instructions. It should be understood the system 200 can include, for example, other modules, devices, and/or processors known in the art and/or varieties of the described modules, devices, and/or processors.

The input devices 240 receive information from a user (not shown) and/or another computing system (not shown). The input devices 240 can include, for example, a keyboard, a scanner, a microphone, a stylus, a touch sensitive pad or display. The output devices 244 output information associated with the system 200 (e.g., information to a printer, information to a speaker, information to a display, for example, graphical representations of information). The processors 216 execute the operating system and/or any other computer executable instructions for the system (e.g., executes applications). The storage devices 252 store a variety of information/data, including radar imaging data generated by the system 200. The display devices 248 display information associated with the system 200 (e.g., status information, configuration information). The storage devices 252 can include, for example, long-term storage, such as a hard drive, a tape storage device, or flash memory; short-term storage, such as a random access memory, or a graphics memory; and/or any other type of computer readable storage.

Figure 3A:
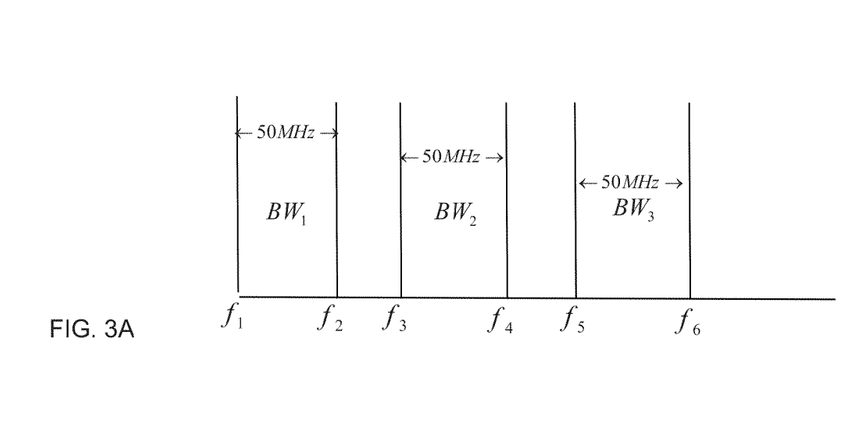
FIG. 3A is a plot of three sub-bands in an exemplary implementation of the technology.
Figure 3B:
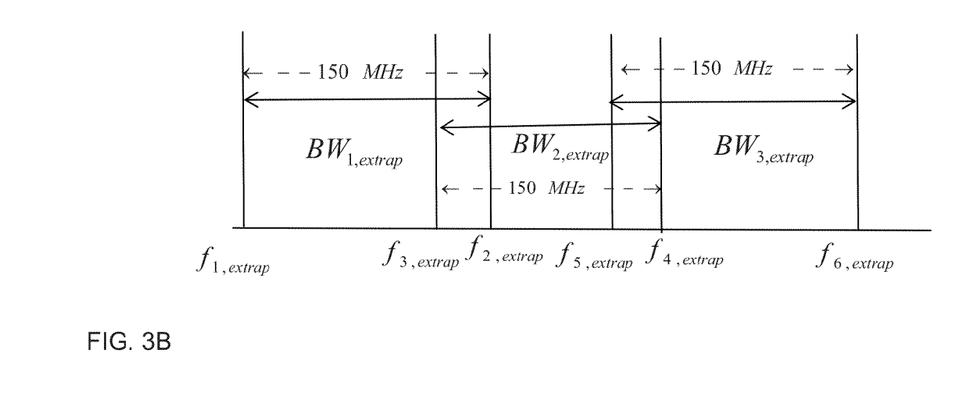
FIG. 3B is a plot of the three sub-bands of FIG. 3A extrapolated to a common size band.

FIG. 3A is a plot of three sub-bands in an exemplary implementation of the technology. The three original sub-bands are denoted by $BW_1$, $BW_2$, and $BW_3$. FIG. 3B is a plot of the three sub-bands of FIG. 3A extrapolated to a common size band (150 MHz is in this example), $BW_{1,extrap}$, $BW_{2,extrap}$, and $BW_{3,extrap}$. As described with respect to FIG. 1 and the equations above, a weighted profile is obtained on each sub-band. The range profiles are then combined to obtain a higher resolution range profile in which the final range profile (also referred to as the combined range profile image and for which an example is illustrated in FIG. 4B) is the product of the common range profile of each band and the combination of the sub-band range profiles.

Figure 4A:
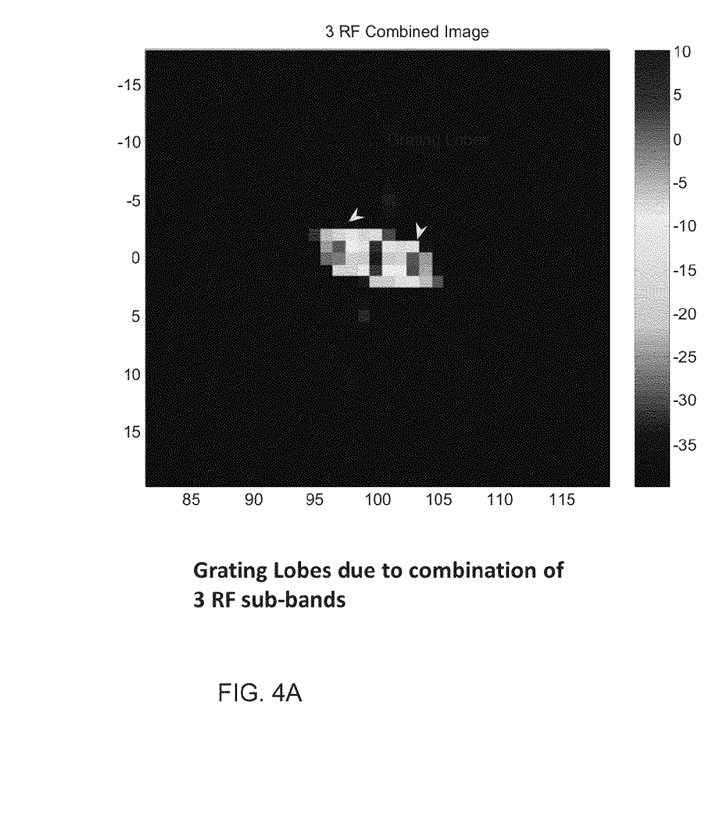
FIG. 4A is a plot of a SAR image produced in the absence of the method described.
Figure 4B:
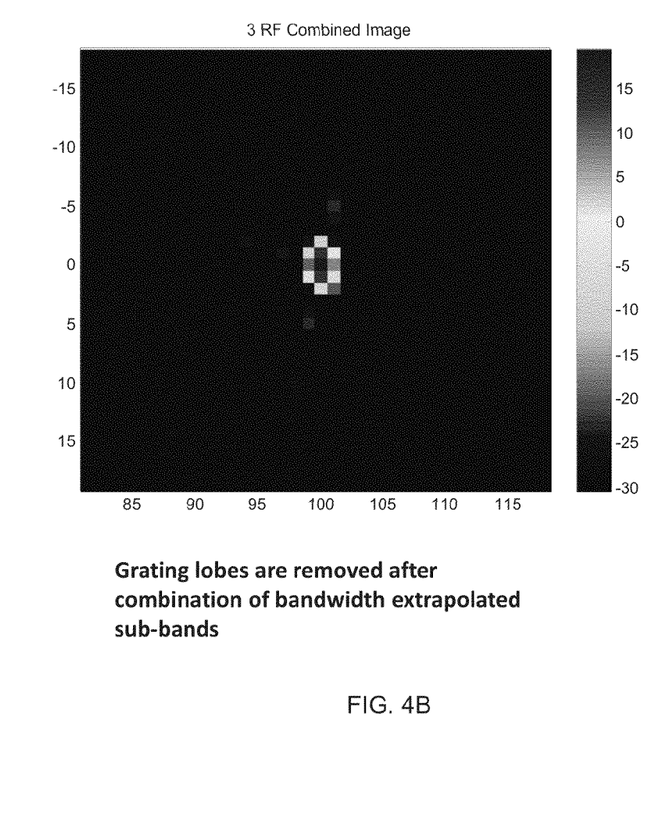
FIG. 4B is a plot of a SAR image produced using the method described.

FIG. 4A is a plot of a SAR image using three RF sub-bands that was produced in the absence of the method described. The SAR image shows grating lobes resulting from combining the three RF sub-bands. FIG. 4B is a plot of a SAR image (the output of step 132 of FIG. 1) using three RF sub-bands that was produced using the method described. The SAR image shows that the grating lobes have been significantly reduced, and the image has a resolution of about 0.6 meters.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. An improved method of operating radar hardware/software apparatus mounted on a moving airplane and used to implement radar image tracking of a ground region of interest and including a transmitter to emit pulse trains torward said region, a receiver to receive return pulses from said region, and a processor to process the return pulses, the transmission and recipt being via one or more antennas and in different frequency bands, the method improvement comprising implementation of a synthetic aperture radar (SAR) imaging method, comprising:
  receiving a plurality of return pulses acquired by said radar, wherein each radar return pulse is generated in response to a corresponding radar transmission pulse reflected from objects within said region of interest;
  operating the apparatus to process each of the radar return pulses by combining them with a sinusoid, to reduce the radar return pulses to a baseband frequency;
  operating the apparatus to deskew each radar return pulse to remove effects of its corresponding radar transmission pulse;
  operating the apparatus to determine a maximum likelihood estimate (MLE) of residual motion parameters for a dominant scatterer on the ground relative to the airborne radar, based on the deskewed radar return pulses thus defining a target item;
  operating the apparatus to correct for errors in inertial navigation system measurements based on the MLE residual motion parameters;
  operating the apparatus to convolve each radar return pulse with its corresponding radar transmission pulse to generate a range compressed image for each radar return pulse;
  operating the apparatus to generate an original sub-band range profile image for each radar return pulse and its corresponding radar transmission pulse based on the corresponding range compressed image that has been corrected for residual motion; and
  operating the apparatus to combine the sub-band range profile images to obtain a combined range profile image of the target item.

2. The method of claim 1, wherein the apparatus is operated such that the combined range profile image has a higher resolution than each of the original sub-band range profile images.

3. The method of claim 1, wherein each sub-band range profile image is generated by extrapolating the sub-band to a common frequency band larger than each of the sub-band range profile images and forming a composite image using an image formation method.

4. The method of claim 3, wherein the image formation method is selected from the group consisting of back projection or polar formatting.

5. The method of claim 1, wherein the radar transmission pulses are disjoint radio frequency bands.

6. The method of claim 5, Wherein two or more of the radar transmission pulses are partially overlapping radio frequency bands.

7. The method of claim 6, wherein the partially overlapping radio frequency bands are established by the processor in a way to reduce side lobe effects in the combined range profile image.

8. The method of claim 1, Wherein convolving each radar return pulse with its corresponding radar transmission pulse to generate a range compressed image for each radar return pulse includes implementing a matched filter to generate the range compressed image for each radar return pulse.

9. The method of claim 1, wherein generating an original sub-band range profile image for each radar return pulse and its corresponding radar transmission pulse includes applying a calibration phasor to each sub-band range profile image to match the phase at the boundaries of the sub-band range profile images.

10. An airborne synthetic aperture radar imaging apparatus comprising a means for pulse emission toward a region of interest on the ground, an antenna and means for receiving return pulses from said region;
  a hardware processor; and
  a hardware memory interactively engaged with the means for transmitting and receiving and the antenas, the memory having instructions stored therein which when executed by a processor cause the processor to:
    receive a plurality of radar return pulses, wherein each radar return pulse is generated in response to a corresponding radar transmission pulse reflected from objects within said region of interest;
    combine each radar return pulse with a sinusoid to reduce the radar return pulses to a baseband frequency;
    deskew each radar return pulse to remove effects of its corresponding radar transmission pulse;
    determine a maximum likelihood estimate (MLE) of residual motion parameters for a dominant scatterer on the ground relative to the airborne radar, based on the deskewed radar return pulses thus defining a target item;
    correct for errors in inertial navigation system measurements based on the MLE residual motion parameters;
    convolve each radar return pulse with its corresponding radar transmission pulse to generate a range compressed image for each radar return pulse;
    generate an original sub-band range profile image for each radar return pulse and its corresponding radar transmission pulse based on the corresponding range compressed image that has been corrected for residual motion; and
    combine the sub-band range profile images to obtain a combined range profile image.

11. The apparatus of claim 10, wherein the memory further includes code representing instructions that when executed cause the processor to generate each sub-band range profile image by extrapolating the sub-band to a common frequency band larger than each of the sub-band range profile images and forming a composite image using an image formation method.

12. The apparatus of claim 11, wherein the image formation method is selected from the group consisting of back projection and polar formatting.

13. The apparatus of claim 10, wherein the memory includes code representing instructions that when executed cause the processor to convolve each radar return pulse with its corresponding radar transmission pulse to generate a range compressed image for each radar return pulse by implementing a matched filter to generate the range compressed image for each radar return pulse.

14. The apparatus of claim 10, wherein generating an original sub-band range profile image for each radar return pulse and its corresponding radar transmission pulse includes applying a calibration phasor to each sub-band range profile image to match the phase at the boundaries of the sub-band range profile images.

* * * * *